United States Patent
Bean et al.

(10) Patent No.: US 9,965,898 B2
(45) Date of Patent: May 8, 2018

(54) OVERLAY DISPLAY

(71) Applicant: INTERNATIONAL BUSINESS MACHINES CORPORATION, Armonk, NY (US)

(72) Inventors: Chris R. Bean, Chandler's Ford (GB); Sophie D. Green, Essex (GB); Madeleine R. Neil Smith, Hampshire (GB); Joe Pavitt, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 14/951,539

(22) Filed: Nov. 25, 2015

(65) Prior Publication Data
US 2016/0155242 A1 Jun. 2, 2016

(30) Foreign Application Priority Data
Dec. 2, 2014 (GB) .................................. 1421351.6

(51) Int. Cl.
*G06T 7/40* (2017.01)
*G06T 19/00* (2011.01)
*G06T 15/50* (2011.01)

(52) U.S. Cl.
CPC .......... *G06T 19/006* (2013.01); *G06T 15/503* (2013.01)

(58) Field of Classification Search
None
See application file for complete search history.

(56) References Cited

U.S. PATENT DOCUMENTS

| 5,473,737 | A | * | 12/1995 | Harper | G09G 5/06 345/501 |
| 6,421,460 | B1 | * | 7/2002 | Hamburg | G06T 15/503 382/162 |
| 8,681,073 | B1 | * | 3/2014 | Robbins | H04N 7/18 345/7 |
| 9,697,641 | B2 | * | 7/2017 | Molnar | G06T 15/503 |
| 2010/0014754 | A1 | * | 1/2010 | Hsieh | H04N 1/40062 382/167 |

(Continued)

FOREIGN PATENT DOCUMENTS

CN 102445756 A 5/2012

OTHER PUBLICATIONS

Livingston et al., "Quantification of contrast sensitivity and color perception using head-worn augmented reality displays", Mar. 14-18, 2009.

(Continued)

*Primary Examiner* — Yu Chen
(74) *Attorney, Agent, or Firm* — Margaret McNamara; Matthew M. Hulihan; Heslin Rothenberg Farley & Mesiti PC (57) ABSTRACT

A system for generating an overlay display comprises an overlay display, a camera and a processor connected to the overlay display and the camera. The overlay display is arranged to overlay an output on a background, the camera is arranged to detect the background, and the processor is arranged to receive a desired color for the output, determine the actual color of the background, and calculate the output color from the desired color and the actual color of the background.

6 Claims, 6 Drawing Sheets

(56) References Cited

U.S. PATENT DOCUMENTS

| | | | | |
|---|---|---|---|---|
| 2011/0090251 A1* | 4/2011 | Donovan | ............... | G06T 15/005 345/632 |
| 2012/0127198 A1* | 5/2012 | Gundavarapu | ........ | G09G 5/026 345/629 |
| 2013/0129206 A1* | 5/2013 | Worthington | .......... | G09G 5/022 382/164 |
| 2013/0207991 A1* | 8/2013 | Sato | ....................... | G02B 27/01 345/589 |
| 2013/0265382 A1 | 10/2013 | Guleryuz et al. | | |
| 2014/0002487 A1* | 1/2014 | Marison | ................... | G09G 5/14 345/629 |
| 2014/0168056 A1 | 6/2014 | Swaminathan et al. | | |
| 2014/0176603 A1 | 6/2014 | Kumar et al. | | |
| 2014/0292825 A1* | 10/2014 | Kim | ....................... | G09G 3/003 345/690 |
| 2015/0074735 A1* | 3/2015 | Herigstad | ............ | H04N 21/478 725/110 |
| 2015/0170606 A1* | 6/2015 | Jureidini | ................. | G09G 5/026 345/592 |
| 2015/0309687 A1* | 10/2015 | Herigstad | .......... | H04N 21/4126 715/784 |
| 2016/0110846 A1* | 4/2016 | Park | .......................... | G06T 5/00 345/589 |
| 2016/0240125 A1* | 8/2016 | Sridharan | ................. | G09G 5/02 |
| 2017/0053456 A1* | 2/2017 | Cho | ......................... | G06F 3/013 |

OTHER PUBLICATIONS

David L. Chandler, "Seeing things: A new transparent display system could provide heads-up data", Jan. 21, 2014, MIT News, http://news.mit.edu/2014/seeing-things-a-new-transparent-display-system-could-provide-heads-up-data-0121.

* cited by examiner

OVERLAY DISPLAY

PRIOR FOREIGN APPLICATION

This application is based on and claims the benefit of priority from United Kingdom Application 1421351.6, filed on Dec. 2, 2014, which is hereby incorporated herein by reference in its entirety.

BACKGROUND

Aspects described herein relate to a system for, and method of, generating an overlay display.

Augmented reality is a live direct or indirect view of a physical, real-world environment whose elements are augmented (or supplemented) by computer-generated sensory input such as sound, video and/or graphics. Augmented reality often renders overlays on top of real-life objects to display additional information and images to a user. These overlays are usually semi-transparent, allowing the user to see the display on top of their real world environment. The overlay display is rarely being rendered onto a solid white background, and is instead being displayed over a continuously changing background composed of various shapes and colors. This can affect the clarity of the overlay display, and in particular, alter the colors that are perceived due to the interference of the color of the background. One solution to this problem is to avoid using transparency within overlays, and instead make the overlays more opaque. This, however, is very difficult to achieve in augmented reality since the overlays are mainly being displayed on either a transparent or translucent display. Some examples of current state of the art are Google glasses, EyeTap and Bubbles glasses, all of which are only capable of displaying translucent overlays, which are rendered independently of the background that they will be displayed against.

SUMMARY

Shortcomings of the prior art are overcome and additional advantages are provided through the provision of a system for generating an overlay display, the system including a memory and a processor in communications with the memory, wherein the computer system is configured to perform a method that includes receiving an indication of a desired color for output to overlay a background, determining a color of the background over which the desired color is to be output, and determining an output color based on the desired color and the color of the background.

Further, a method is provided for generating an overlay display, the method including receiving an indication of a desired color for output to overlay a background, determining a color of the background over which the desired color is to be output, and determining an output color based on the desired color and the color of the background.

Yet further, a computer program product for generating an overlay display is provided that includes a computer readable storage medium readable by a processor and storing instructions for execution by the processor for performing a method that includes receiving an indication of a desired color for output to overlay a background, determining a color of the background over which the desired color is to be output, and determining an output color based on the desired color and the color of the background.

Additional features and advantages are realized through the concepts of the present invention. Other embodiments and aspects of the invention are described in detail herein and are considered a part of the claimed invention.

BRIEF DESCRIPTION OF THE DRAWINGS

Embodiments of the present invention will now be described, by way of example only, with reference to the following drawings, in which.

DETAILED DESCRIPTION

Figure 1:
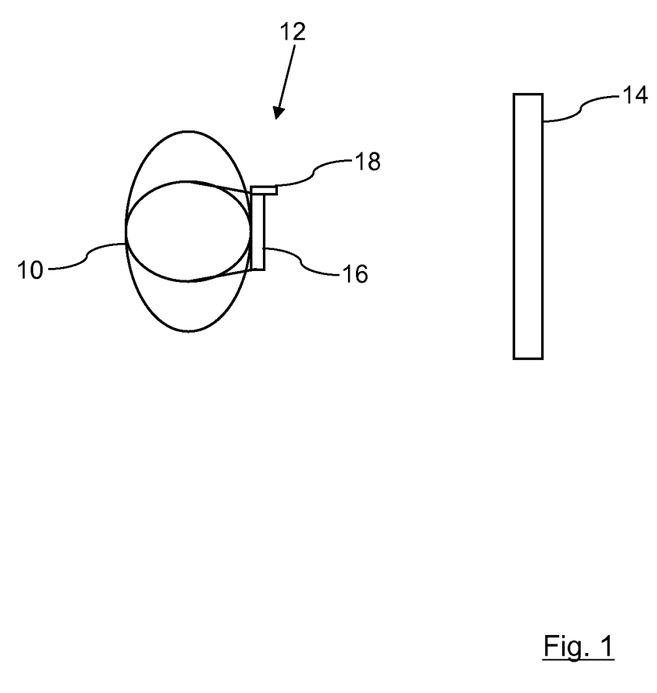
FIG. 1 is an example schematic diagram of a user with an augmented reality system.

FIG. 1 shows a user 10 wearing an augmented reality system 12 while looking at a background 14. The system 12 is a pair of glasses which include an overlay display 16 and a camera 18. The user 10 looks at the background 14 through the glasses, while at the same time the overlay display 16 is projecting a transparent image onto the glasses that is perceived by the user 10 to be on top of the background 14. The camera 18 is able to capture the background and to determine where and at what the user 10 is looking The system 12 also includes a processor connected to the overlay display 16 and the camera 18.

As an example of the use of the system 12, the user 10 might be a tourist who is in a foreign country and the background 14 is a map of a specific locality with text in the local language. The augmented reality system 12 can generate a transparent image on the overlay display 16 that provides the text of the map in the user's language. From the point of view of the user 10, the augmented text is perceived to be actually on the background 14, since the projection of the transparent image onto the overlay display 16 causes the user's eye to see the text of the overlay image at the depth of the background 14.

The augmented reality system 12 is configured so that the color chosen for the element(s) that make up the output of the overlay display 16 takes into account the color of the background. A desired (or target) color for the output is modified by the detected actual color of the background 14 to produce an output color for the overlay display 16. In one embodiment of the system 12, the calculated output color varies at a per-pixel or per-pixel-block level according to variation in the actual color of the background 14. This provides an overlay output that looks consistent to the user 10, independent of the color of the background 14.

Figure 2:
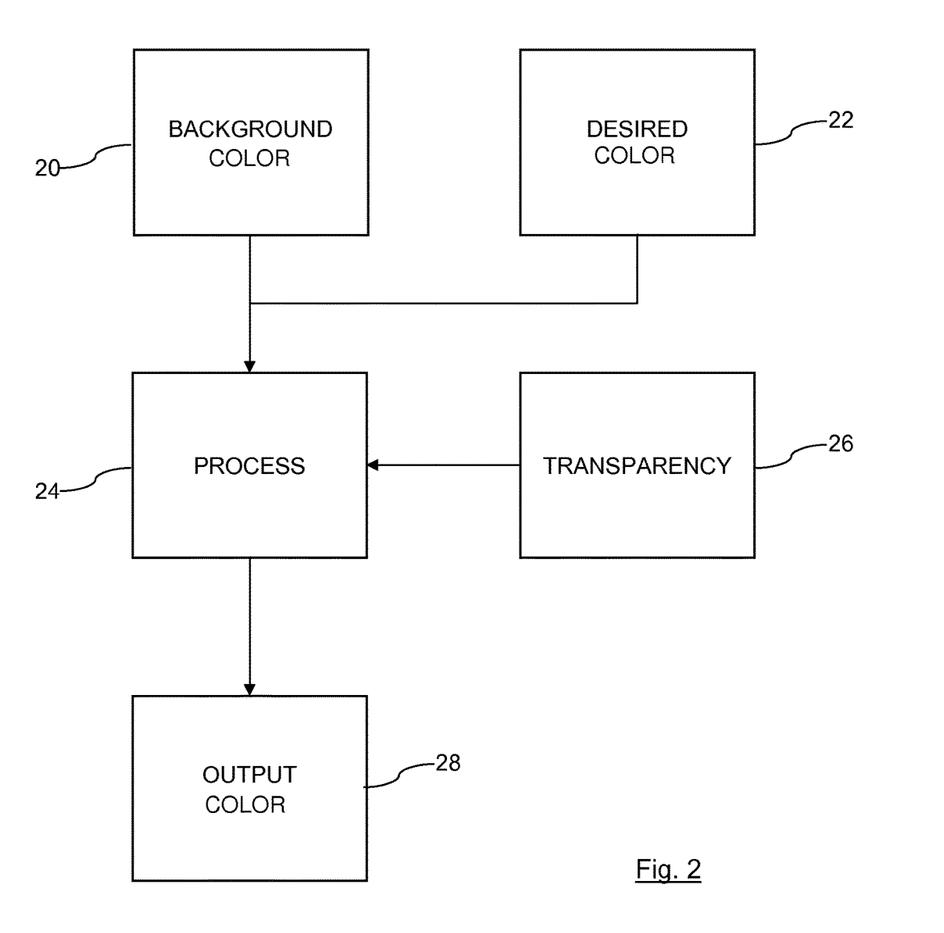
FIG. 2 is an example schematic diagram of a process of producing an output color.

FIG. 2 illustrates schematically an example processing carried out by the processor of the augmented reality system 12, where the perceived background color 20 (detected by the camera 18) and the desired (target) color 22 are used in a process 24. The transparency 26 of the overlay display 16 can also be used as an input to the process 24, although this is optional and will depend on the configuration of the system 12. The process 24 provides an output color 28 which is used by the overlay display 16 in generating its output that is then provided to the user 10. The desired color 22 is effectively modified by the detected actual background color 20.

In the process 24, the calculation of the output color 28 can vary at a per-pixel or per-pixel-block level according to variation in the actual color of the background 14. Since it may be likely that the background 14 is not itself a uniform color, in one embodiment, there is not a single color used for a single element being shown in the overlay display 16. By calculating the color(s) to use on a pixel by pixel basis, or slightly larger regions for processing efficiency, a single element is broken down and displayed in multiple colors. Owing to the variation in the background color 14, the element would be perceived by the user as a uniform foreground color.

The system 12 replaces the traditional augmented overlays that use a single base color for an object (rendering text in the same color throughout a word/sentence, for example), by breaking down the overlay into sections dependent upon the variations in background color 20. The foreground/overlay (FG) color 28 is then re-calculated in each section taking into account the effect that the background (BG) color 20 would have on its perception. By doing this, the output can be rendered in different colors through a given word or image such that the user 10 sees that color as intended due to the additive influence of the background color 20. A better output is provided to the user 10 as a result.

The mathematics that may be used in the process 24 is derived from a simple equation that calculates the resulting color (MX) when a semi-transparent color (FG-transparency measure is FGalpha) is overlaid onto an opaque color (BG). The generalized equation for this calculation is as follows:

$$(FGcolor*FGalpha)+(BGcolor*(1-FGalpha))=MXcolor$$

Using this for each color stream in an RGB space, it is possible to arrive at the following equations, where each value must be between 0 and 1 (scaled from 0 to 255 for traditional RGB values):

$$(FGred*FGalpha)+(BGred*(1-FGalpha))=MXred$$

$$(FGgreen*FGalpha)+(BGgreen*(1-FGalpha))=MXgreen$$

$$(FGblue*FGalpha)+(BGblue*(1-FGalpha))=MXblue$$

Since it is known what the desired output color is to be (the MX values) and the processor is varying the overlay color (the FG values) in order to achieve this, it is possible to make the FGcolor the subject of the equations as follows:

$$FGred=[MXred-(BGred*(1-FGalpha))]/FGalpha$$

$$FGgreen=[MXgreen-(BGgreen*(1-FGalpha))]/FGalpha$$

$$FGblue=[MXblue-(BGblue*(1-FGalpha))]/FGalpha$$

From the above, it can be seen that everything is known in order to calculate the required color, with MXcolor being the desired color for display as perceived by the user 10, BGcolor is the color retrieved from the camera feed and FGalpha is the transparency of the display used, it is possible to calculate the required color. This methodology cannot always produce an exact result, since it is not always possible to achieve the target color (MX) starting from the specific background color (BG). The mathematics in this case returns an FGcolor value outside the 0 to 1 range. In this case, the process 24 makes the value equal to the boundary crossed. If FGred is required to be 1.24, it is bound to a value of 1 instead. This results in a non-uniform display, but one that is still easier to read and appears more uniform than otherwise.

Figure 3:
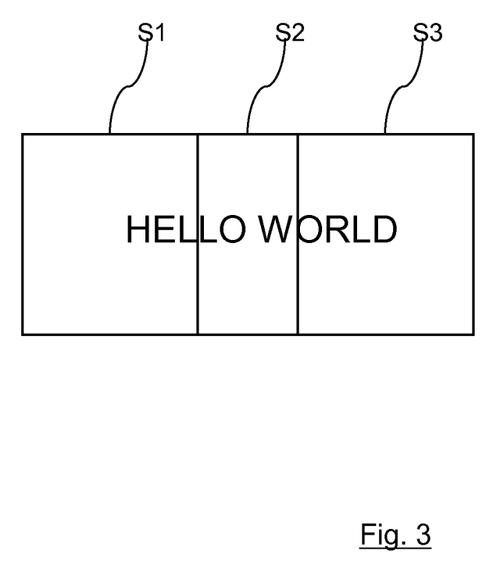
FIGS. 3 to 5 are examples of color processing in production of an output color.

FIG. 3 shows an example image to illustrate the processing in action. In this example, the overlay display 16 renders "HELLO WORLD" on an overlay which has alpha/transparency equal to 0.6. Since this phrase is being placed on a background that includes three different colored sections S1, S2 and S3, then the processor breaks this down into three sections, "HEL", "LO W" and "ORLD" and renders each section in a slightly different color which takes into account the color behind the text. In this case the colors used are "HEL"=R: 99, G: 235, B: 195; "LO W"=R: 139, G: 201, B: 197; "ORLD"=R: 124, G: 253; B: 158, all of which had a transparency of 0.6.

Figure 4:
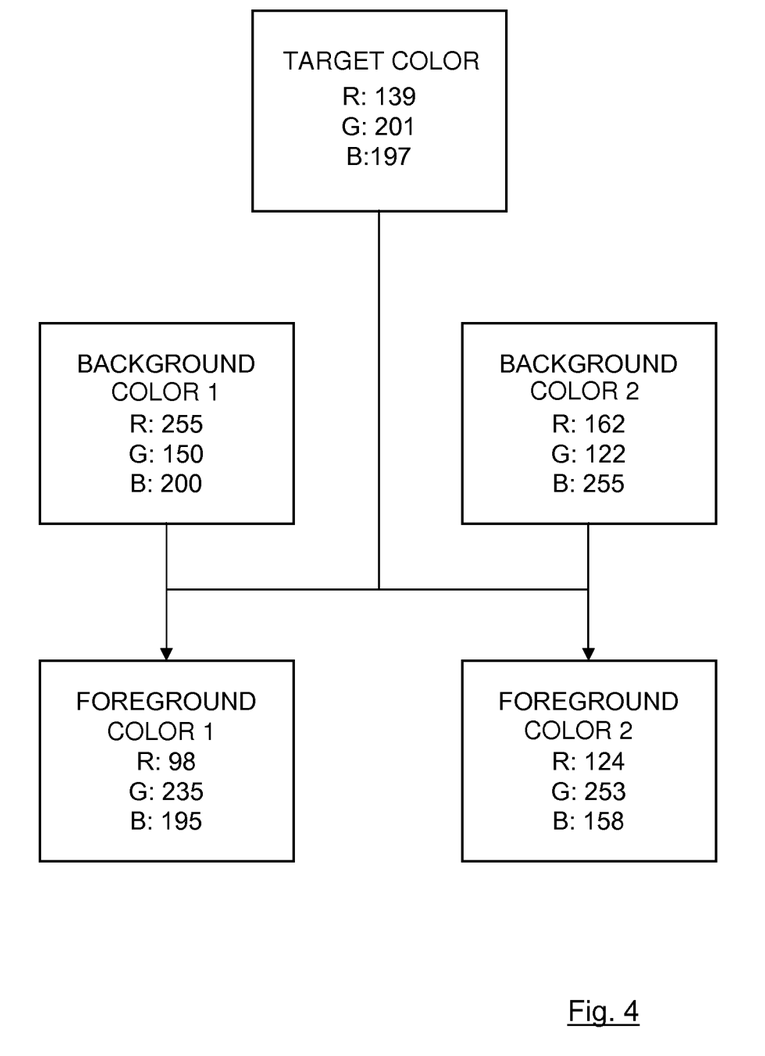

FIG. 4 shows a second example of the processing, showing how the foreground color would be selected for a specific target color that is to be placed on top of two different backgrounds 14. In this example, the target color is R: 139, G: 201, B: 197 expressed on a 0 to 255 scale. The left-hand background has a color of R: 255, G: 150, B: 200 and the right-hand background has a color of R: 162, G: 122, B: 255. Processing these RGB values according to the formulas given above, using a transparency value of 0.6, then the foreground color to use on the left-hand background is R: 98, G: 235, B: 195 and the foreground color to use on the right-hand background is R: 124, G: 253, B: 158.

Figure 5:
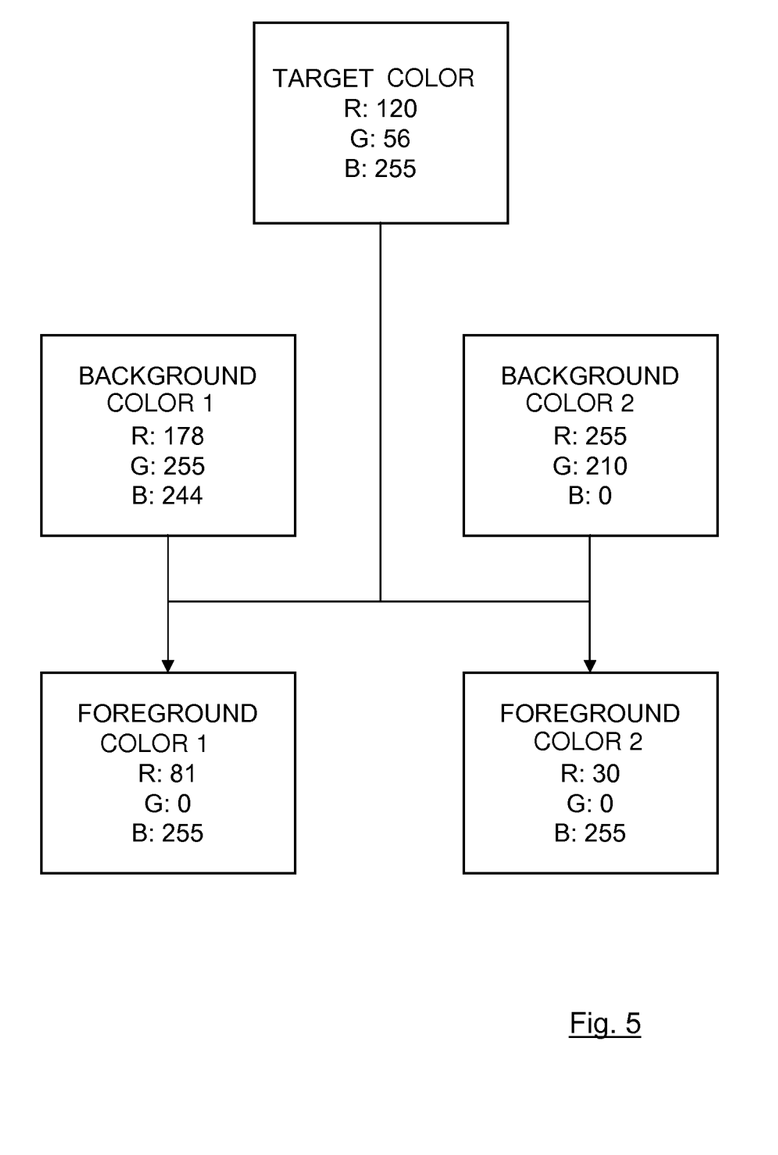

FIG. 5 shows a third example of the processing, showing how the foreground color would be selected for a specific target color that is to be placed on top of two different backgrounds 14. In this example, the target color is R: 120, G: 56, B: 255 expressed on a 0 to 255 scale. The left-hand background has a color of R: 178, G: 255, B: 244 and the right-hand background has a color of R: 255, G: 210, B: 0. Processing these RGB values according to the formulas given above, using a transparency value of 0.6, then the foreground color to use on the left-hand background is R: 81, G: 0, B: 255 and the foreground color to use on the right-hand background is R: 30, G: 0, B: 255. Although the use of these colors will not give the exact target color that is desired, these colors chosen for the foreground colors are the closest that can be achieved given the combination of the background colors and the target color.

Figure 6:
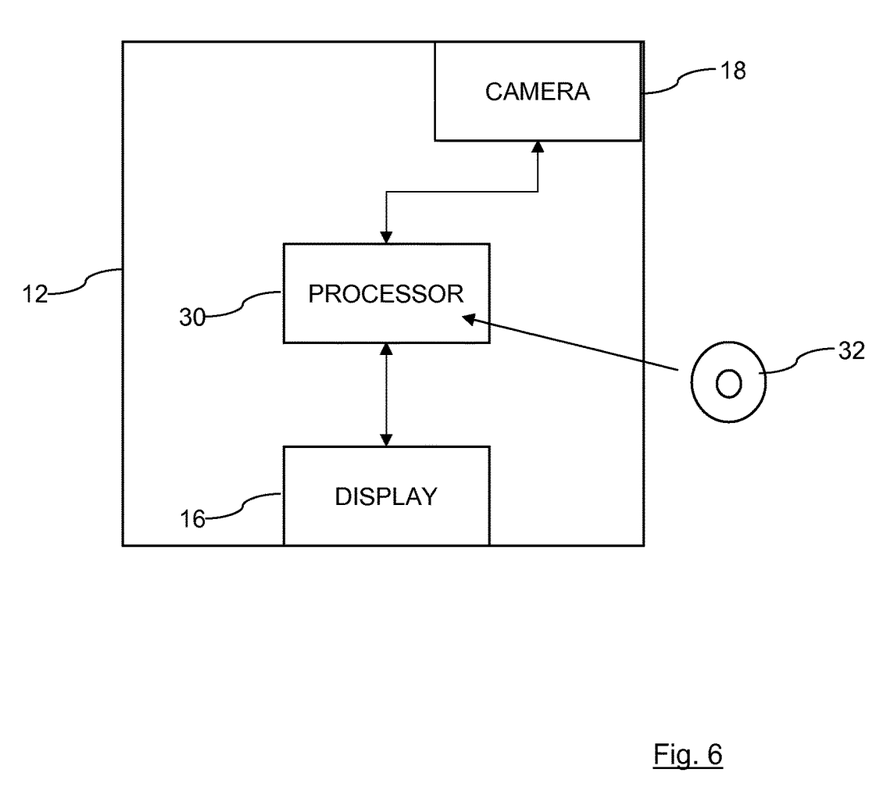
FIG. 6 is an example schematic diagram of a system for generating an overlay display.

FIG. 6 shows schematically an example system 12 for generating an overlay display. The system includes an overlay display 16, which is arranged to overlay an output on a background, a camera 18, which is arranged to detect the background, and the processor 30, which is connected to the overlay display 16 and the camera 18. In summary, the processor 30 is arranged to receive a desired color 22 for the output, determine the actual color 20 of the background 14, and calculate the output color 28 from the desired color 22 and the actual color 20 of the background 14. A CD-ROM 32 is shown that can carry a computer program product including instructions for controlling the processor 30.

In this embodiment, the system 12 is embodied as a single device, which is the glasses 12 shown in FIG. 1, which includes within it all of the components shown in FIG. 6, along with a power supply and some form of data storage. The user 10 wears the glasses 12 and perceives the background 14 through the glasses 12, while at the same time the overlay display 16 is projecting a transparent overlay into the user's field of vision. The choice of the output color 28 for the overlay element(s) is dependent on the relationship between the target color 22 for the element(s) and the background color 20 of the background 14.

As mentioned above, the processor 30 is controlled so that the output color 28 varies over the output of the overlay display 16, according to variation in the background color 20. This can be achieved at a per-pixel level or a per-pixel-block level according to the configuration of the processor 30. Since the background may be highly unlikely to be of a uniform color, the output color 28 chosen can take this into account and vary over the elements of the overlay. The user will then perceive an overlay that appears to be a single color, despite the fact that they are viewing a transparent overlay display that is overlaid on a background 14 that is not uniform in terms of color.

According to an aspect described herein, there is provided a system for generating an overlay display, the system including an overlay display arranged to overlay an output on a background, a camera arranged to detect the background, and a processor connected to the overlay display and the camera and arranged to receive a desired color for the output, determine the actual color of the background, and calculate the output color from the desired color and the actual color of the background.

According to another aspect described herein, there is provided a method for generating an overlay display in a system including an overlay display, a camera and a processor connected to the overlay display and the camera, the method including receiving a desired color for the output, determining the actual color of the background, and calculating the output color from the desired color and the actual color of the background.

According to yet another aspect described herein, there is provided a computer program product on a computer readable medium for generating an overlay display in a system comprising an overlay display, a camera and a processor connected to the overlay display and the camera, the computer program product including instructions for receiving a desired color for the output, determining the actual color of the background, and calculating the output color from the desired color and the actual color of the background.

It is possible to provide an overlay display system that provides augmented reality which will provide overlays that are far more readable than is currently the case, as the color of the overlay will be adapted in relation to the background color over which the overlay is being superimposed. The system makes use of a camera feed recorded by a device, which provides an image of the user's real world environment from the user's perspective. Rather than simply overlaying a new element of uniform color on top of the background, the color of the element would be calculated based upon the color of the background (the camera feed) in the respective areas. The improved system over the state of the art make the overlays easier to read against a busy background.

The calculated output color can vary at a per-pixel or per-pixel-block level according to variation in the actual color of the background. In one embodiment, there is not a single color for a single element being shown in the overlay display. By calculating the color(s) to use on a pixel by pixel basis, or slightly larger regions for processing efficiency, a single element is broken down and displayed in multiple colors. Owing to the variation in the background color, the element would be perceived by the user as a uniform foreground color.

Advantageously, the processor of the system may be arranged, when calculating the output color from the desired color and the actual color of the background, to use a predefined formula to generate RGB values for the output color from the RGB values of the desired color as modified by the RGB values of the actual color of the background. Using RGB values and a predefined formula provides a simple and fast methodology for delivering the calculation of the color(s) to be used in the overlay display for the element being displayed. RGB values are easy to handle from a computational point of view while also providing a usable output.

The processor may be further arranged to receive a transparency value for the overlay display and to use the received transparency value when calculating the output color from the desired color and the actual color of the background. By using a transparency value in the calculation of the output color, a more accurate calculation of the desired color to use for the specific overlay display is produced. The amount of transparency that a specific overlay display is using can affect how the user's eye perceives the color of the overlay element and so by taking the transparency value into account (which is normally expressed as a number between 0 and 1) a better end result is produced in the selection of the color for the overlay element with respect to the background color.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A system for generating an overlay display, the system comprising:
   a memory; and
   a processor in communication with the memory, wherein the computer system is configured to perform a method comprising:
   receiving an indication of a desired color for output to overlay a background;
   determining a color of the background over which the desired color is to be output;
   receiving a transparency value for the overlay display; and
   determining an output color based on the desired color and the color of the background, the determining the output color comprising modifying RGB values representing the desired color using RGB values representing the determined color of the background to obtain the output color, the determining further comprising using the received transparency value in the determining the output color based on the desired color and the color of the background and using a predefined formula to generate RGB values for the output color based on RGB values of the desired color as modified by RGB values of the color of the background, wherein the predefined formula comprises:

foreground color=(resulting color−(background color*(1−transparency value)))/transparency value;

wherein foreground color is the output color, resulting color is the desired color, background color is the color of the background, and transparency value is the transparency value for the overlay display.

2. The system of claim 1, wherein the determined output color varies at a per-pixel or per-pixel-block level according to variation in the color of the background.

3. A method for generating an overlay display, the method comprising:
   receiving an indication of a desired color for output to overlay a background;
   determining a color of the background over which the desired color is to be output;
   receiving a transparency value for the overlay display; and
   determining an output color based on the desired color and the color of the background, the determining the output color comprising modifying RGB values representing the desired color using RGB values representing the determined color of the background to obtain the output color, the determining further comprising using the received transparency value in the determining the output color based on the desired color and the color of the background and using a predefined formula to generate RGB values for the output color based on RGB values of the desired color as modified by RGB values of the color of the background, wherein the predefined formula comprises:

foreground color=(resulting color−(background color*(1−transparency value)))/transparency value;

wherein foreground color is the output color, resulting color is the desired color, background color is the color of the background, and transparency value is the transparency value for the overlay display.

4. The method of claim 3, wherein the determined output color varies at a per-pixel or per-pixel-block level according to variation in the color of the background.

5. A computer program product for generating an overlay display, the computer program product comprising:

a computer readable storage medium readable by a processor and storing instructions for execution by the processor for performing a method comprising:

receiving an indication of a desired color for output to overlay a background;

determining a color of the background over which the desired color is to be output;

receiving a transparency value for the overlay display; and determining an output color based on the desired color and the color of the background, the determining the output color comprising modifying RGB values representing the desired color using RGB values representing the determined color of the background to obtain the output color, the determining further comprising using the received transparency value in the determining the output color based on the desired color and the color of the background and using a predefined formula to generate RGB values for the output color based on RGB values of the desired color as modified by RGB values of the color of the background, wherein the predefined formula comprises:

foreground color=(resulting color−(background color*(1−transparency value)))/transparency value;

wherein foreground color is the output color, resulting color is the desired color, background color is the color of the background, and transparency value is the transparency value for the overlay display.

6. The computer program product of claim 5, wherein the determined output color varies at a per-pixel or per-pixel-block level according to variation in the color of the background.

\* \* \* \* \*